(12) United States Patent
Novak et al.

(10) Patent No.: US 9,217,072 B2
(45) Date of Patent: *Dec. 22, 2015

(54) LOW DUST, LIGHT WEIGHT FILLER COMPOSITION

(71) Applicant: Arizona Cultured Stone Products, Inc., Tucson, AZ (US)

(72) Inventors: Gregory S. Novak, Tucson, AZ (US); John P. Simmons, Farmington Hills, MI (US); Stephen Gleason, Chicago, IL (US)

(73) Assignee: Arizona Cultured Stone Product, Inc., Tucson, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/579,851

(22) Filed: Dec. 22, 2014

(65) Prior Publication Data

US 2015/0111977 A1    Apr. 23, 2015

Related U.S. Application Data

(62) Division of application No. 13/928,232, filed on Jun. 26, 2013, now Pat. No. 8,915,996.

(60) Provisional application No. 61/664,269, filed on Jun. 26, 2012.

(51) Int. Cl.
| | | |
|---|---|---|
| *C08K 3/26* | (2006.01) |
| *C08K 7/22* | (2006.01) |
| *C08K 3/30* | (2006.01) |
| *C08K 5/053* | (2006.01) |

(52) U.S. Cl.
CPC .... *C08K 7/22* (2013.01); *C08K 3/26* (2013.01); *C08K 3/30* (2013.01); *C08K 5/053* (2013.01); *C08K 2003/265* (2013.01); *C08K 2003/3045* (2013.01)

(58) Field of Classification Search
USPC ........................................................ 106/409
See application file for complete search history.

(56) References Cited

U.S. PATENT DOCUMENTS

| | | | |
|---|---|---|---|
| 5,254,598 A * | 10/1993 | Schlameus et al. | 521/54 |
| 5,498,645 A * | 3/1996 | Mariano et al. | 523/218 |
| 6,545,066 B1 * | 4/2003 | Immordino et al. | 523/218 |
| 2008/0287575 A1* | 11/2008 | Terry Lee et al. | 524/58 |

* cited by examiner

*Primary Examiner* — Kara Boyle
(74) *Attorney, Agent, or Firm* — Dale F. Regelman; Quarles & Brady LLP

(57) ABSTRACT

A filler composition for use in a casting formulation, where the filler composition includes a mineral filler, hollow plastic microspheres, and a food grade and non-flammable liquid, and where when the filler composition is mixed with a casting resin an OSHA 8-hour Permissible Exposure Limit set for Particulates Not Otherwise Regulated is not exceeded.

11 Claims, 1 Drawing Sheet

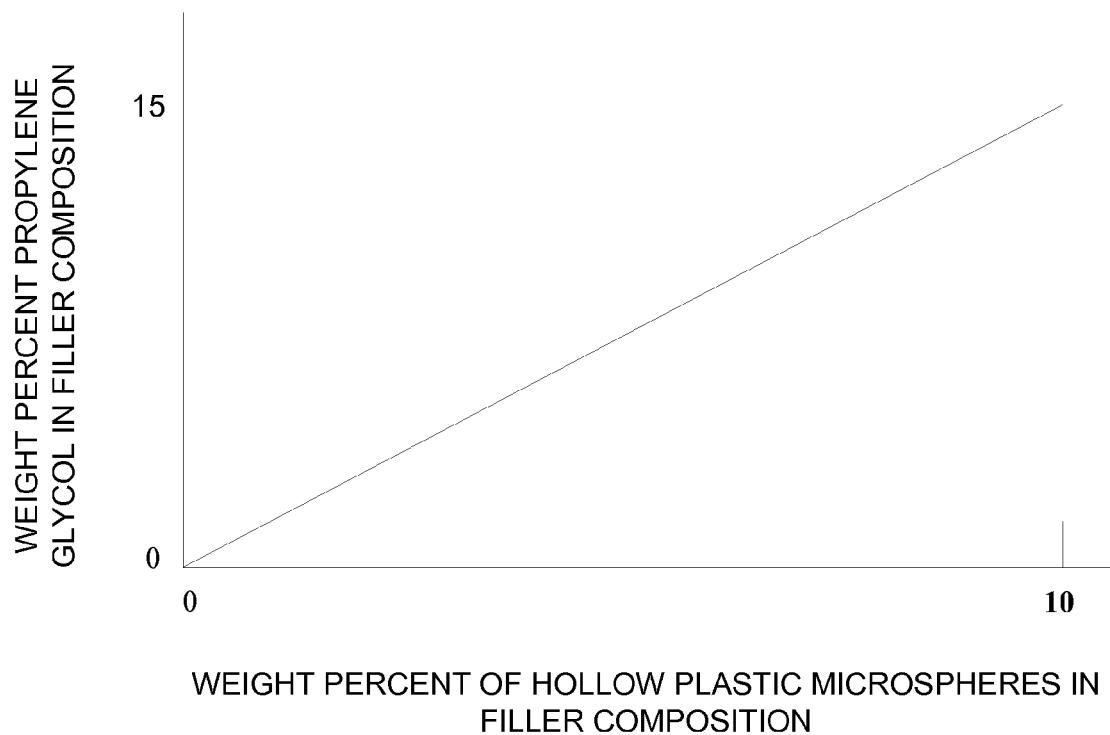

LOW DUST, LIGHT WEIGHT FILLER COMPOSITION

CROSS REFERENCE TO RELATED APPLICATIONS

This Application is a Divisional Application of a U.S. Non-Provisional Application having Ser. No. 13/928,232 filed Jun. 26, 2013, now U.S. Pat. No. 8,915,996, which is hereby incorporated by reference.

FIELD OF THE INVENTION

The invention is directed to a low dust, light weight filler concentrate, and a casting formulation using that filler concentrate.

BACKGROUND OF THE INVENTION

Hollow plastic microspheres can be used in all standard processing methods for thermoset and thermoplastic composites. Microspheres are produced for a variety of applications using a fairly broad range of materials. Although they have less compressive strength than glass microspheres, hollow plastic microspheres offer many of the same advantages as rigid glass microspheres and are among the lightest fillers available. Standard specific gravities are as low as 0.015, providing large volume displacement at a very low weight.

Regulations promulgated under the federal Occupational Safety and Heath Act make reference to particulates not otherwise regulated ("PNOR"). Such PNOR materials include "all inert or nuisance dusts, whether mineral, inorganic, or organic" that do not have an assigned PEL, contain <1% quartz and do not contain asbestos. See, 29 CFR 1910.1000 TABLE Z-1 at footnote (f). Under these federal regulations, the Permissible Exposure Limits as 8-hour Time Weighted Averages are 15 mg/m3 for all PNORs, and 5 mg/m3 for respirable PNORs. Respirable sized particles are defined by OSHA as less than 3.5 microns in size.

Hollow plastic microspheres utilized as fillers in resin system are generally between about 12 to about 300 microns in diameter. This being the case, airborne hollow plastic microspheres are generally regulated as PNORs.

SUMMARY OF THE INVENTION

A filler composition for use in a casting formulation is presented. In certain embodiments, the filler composition comprises a mineral filler, hollow plastic microspheres, and a food grade and non-flammable liquid. When the filler composition is being handled and mixed with a casting resin, an OSHA 8-hour Permissible Exposure Limit set for Particulates Not Otherwise Regulated is not exceeded.

BRIEF DESCRIPTION OF THE DRAWINGS

The invention will be better understood from a reading of the following detailed description taken in conjunction with the drawings in which like reference designators are used to designate like elements, and in which:

FIG. 1 graphically shows a weight percent of a food grade, non-flammable liquid portion of Applicants' filler composition based upon a weight percent of hollow plastic microspheres present in that filler composition.

DETAILED DESCRIPTION OF THE PREFERRED EMBODIMENTS

The invention is described in preferred embodiments in the following description with reference to the FIGS., in which like numerals represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow charts included are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Applicants' filler composition is described herein with reference to hollow plastic microspheres. This description should not be taken as limiting. In other embodiments, Applicants' filler composition comprises glass microspheres. In still other embodiments, Applicants' filler composition comprises a mixture of plastic microspheres and glass microspheres.

Hollow plastic microspheres are small spherical plastic particles. The microspheres consist of a polymer shell encapsulating a gas. When the gas inside the shell is heated, it increases its pressure and the thermoplastic shell softens, resulting in a dramatic increase in the volume of the microspheres. In certain embodiments, when fully expanded, the volume of the microspheres increases more than about 40 times.

To the naked eye, the small, hollow spheres appear like fine powder. Ranging from 12 to 300 μm in diameter. The density of such hollow plastic microspheres ranges from about 0.009 grams per cubic centimeter ("g/cc") to about 0.13 g/cc.

Hollow plastic microspheres can be used in all standard processing methods for thermoset and thermoplastic composites. Microspheres are produced for a variety of applications using a fairly broad range of materials. Although they have less compressive strength than glass microspheres, hollow plastic microspheres offer many of the same advantages as rigid glass microspheres and are among the lightest fillers available. Standard specific gravities are as low as 0.015, providing large volume displacement at a very low weight.

Certain ultra lightweight hollow plastic microspheres comprise a density of about 0.015 g/cc. In certain embodiments, these material comprise a very thin thermoplastic shell (a copolymer, such as vinylidene chloride, acrylo-nitrile or methyl methacrylate) that encapsulates a hydrocarbon blowing agent (typically isobutane or isopentane). When heated, the polymeric shell gradually softens, and the liquid hydrocarbon begins to gasify and expand. When the heat is removed, the shell stiffens and the microsphere remains in its expanded form. Expansion temperatures range from 80° C. to 190° C. (176° F. to 374° F.), depending on the grade. The particle size for expanded microspheres ranges from 20 μm to 150 μm, depending on the grade. When fully expanded, the volume of the microspheres increases more than 40 times.

Unlike glass microspheres, plastic micro-spheres are much less susceptible to breakage. Excessive pressure will cause the plastic sphere to flatten but not burst. In certain embodiments, in spray-up applications, the microspheres will deform when the resin is pressurized prior to spraying. After the material hits the mold and returns to ambient pressure, the microspheres will rebound to their spherical shape.

This compressive capability can provide some control over thermal expansion as well. The heat of exotherm during cure can be problematic in composite manufacture. By incorporating plastic microspheres, as the part heats up, the resin is able to expand inward, causing the microspheres to compress. Once the heat dissipates, the spheres rebound. In certain embodiments, the microspheres retain this flexibility even after cure. Hollow plastic microspheres can be supplied in either expanded or unexpanded form.

The most obvious benefit of the hollow microsphere is its potential to reduce part weight, which is a function of density. Compared to mineral-based fillers, such as calcium carbonate, gypsum, mica, silica and talc, hollow plastic microspheres have much lower densities. In certain embodiments, Applicants' filler systems comprise about 1 to about 5 percent by weight hollow plastic microspheres, which can equate to up to 80 percent or more by volume.

Regulations promulgated under the federal Occupational Safety and Heath Act make reference to particulates not otherwise regulated ("PNOR"). Such PNOR materials include "all inert or nuisance dusts, whether mineral, inorganic, or organic" that do not have an assigned PEI, contain <1% quartz and do not contain asbestos. See, 29 CFR 1910.1000 TABLE Z-1 at footnote (f). Under these federal regulations, the Permissible Exposure Limits as 8-hour Time Weighted Averages are 15 mg/m3 for all PNORs, and 5 mg/m3 for respirable PNORs. Respirable sized particles are defined by OSHA as less than 3.5 microns in size.

Hollow plastic microspheres utilized as fillers in resin system are generally between about 12 to about 300 microns in diameter. This being the case, airborne hollow plastic microspheres are generally regulated as non-respirable PNORs.

Even if an OSHA 8-hour TWA PEL is not exceeded, handling large quantities of such hollow plastic microspheres is extremely difficult. Inhalation of such airborne hollow plastic microspheres can cause respiratory distress, including for example choking, coughing, and/or gagging.

Applicants have discovered a method to eliminate the hazards resulting from handling such hollow plastic microspheres when compounding resin formulations. Applicants have found that hollow plastic microspheres can be placed into a tumble mixer and then sprayed with a liquid, such as for example and without limitation, propylene glycol.

As those skilled in the art will appreciate, Applicants' filler composition will be utilized with a resin system. The liquid sprayed onto the hollow plastic microspheres must be compatible with the resin system. In certain embodiments, the liquid is also non-hazardous and preferably food grade and non-flammable. Such liquids include, without limitation glycols, silicone oils, and natural oils.

In certain embodiments, the liquid is sprayed onto room temperature hollow plastic microspheres. In other embodiments, the liquid is sprayed onto heated hollow plastic microspheres. The plastic microspheres are heated to a temperature to cause the polymeric shell to soften. This not only allows the microspheres to expand, but also renders the surface of that polymeric shell "tacky." Such a tacky surface promotes good adhesion of the liquid molecules to the surfaces of the heated hollow plastic microspheres. In general, the hollow plastic microspheres are heated a Vicat softening temperature for the polymer used to form the microsphere shell.

For example, if the hollow plastic microspheres are formed from linear low density polyethylene, then those microspheres would be heated to between about 86° C. and about 100° C. On the other hand, if the hollow plastic microspheres are formed from high density polyethylene then those microspheres would be heated to between about 112° C. to about 132° C.

In certain embodiments, the hollow plastic microspheres are tumbled mixed with one or more mineral fillers. In certain embodiments, the hollow plastic microspheres comprise between 50 volume percent to 100 volume percent of the Applicants' filler composition. In certain embodiments, the one or more mineral fillers comprise aluminum trihydrate, talc, gypsum, magnesium hydroxide, and dolomite.

The weight percentage of the liquid, such as propylene glycol, used in the filler composition varies almost linearly with the aggregate surface area percentage of the hollow plastic microspheres in the filler composition. FIG. 1 graphically shows the weight percentage of propylene glycol sprayed onto the hollow plastic microspheres as a function of the surface area percent of those hollow plastic microspheres in Applicants' filler composition. FIG. 1 graphically shows the weight percent of propylene glycol used. As described hereinabove, other liquids may be employed instead of, or in combination with, propylene glycol.

Applications for Applicants' filler blend comprising, in part or in whole, hollow plastic microspheres, include fiberglass spray up, and cast polymer applications in both open and closed mold processes.

The following examples are presented to further illustrate to persons skilled in the art how to make and use the invention. These examples are not intended as a limitation, however, upon the scope of the invention.

EXAMPLE 1

A filler concentrate was formed comprising about 95.1 weight percent calcium sulfate, 1.9 weight percent hollow microspheres, and 3 weight percent propylene glycol. Calcium sulfate has a density of about 3.0 g/cc, and the hollow microspheres have a density of about 0.012 g/cc. A 100 gram batch of this filler concentrate comprises 95.1 g. $CaSO_4$, or about 31.7 cc of $CaSO_4$; 1.9 g hollow microspheres, or about 158 cc microspheres; and 3 grams of propylene glycol, or about 2.9 cc propylene glycol, for a total volume of about 192.6 cc. This filler concentrate has a density of about 0.52 g/cc.

EXAMPLE 2

A casting formulation was formed using 50 weight percent polyester resin (0.54 g/cc), 45 weight percent calcium sulfate (3.0 g/cc), and 5 weight percent of the filler concentrate of Example 1 (0.52 G/CC). The resulting casting formulation, and parts formed from that casting formulation, had a density of about 0.85 g/cc. A prior art casting formulation, and castings made therefrom, using 50 weight percent polyester resin and 50 weight percent calcium sulfate comprises a bulk density of about 0.91 g/cc.

EXAMPLE 3

A casting formulation was formed using 75 weight percent polyester resin and 25 weight percent of the filler concentrate of Example 1. The resulting casting formulation, and parts formed from that casting formulation, had a density of about 0.53 g/cc.

EXAMPLE 4

A filler concentrate was formed comprising about 97.2 weight percent calcium carbonate, 0.8 weight percent hollow microspheres, and 2 weight percent propylene glycol. Calcium Carbonate has a density of about 2.75 g/cc, and the hollow microspheres have a density of about 0.012 g/cc. A 100 gram batch of this filler concentrate comprises 97.2 g. $CaCO_3$, or about 35.3 cc of $CaCO_3$; 0.8 g hollow microspheres, or about 66.7 cc microspheres; and 2 grams of propylene glycol, or about 2 cc propylene glycol, for a total volume of about 104 cc. This filler concentrate has a density of about 0.96 g/cc.

EXAMPLE 5

A casting formulation was formed using 50 weight percent polyester resin (0.54 g/cc) and 50 weight percent of the filler concentrate of Example 4 (0.96 g/cc). The resulting casting formulation, and parts formed from that casting formulation, had a density of about 0.70 g./cc. A prior art casting formulation, and castings made therefrom, using 25 weight percent polyester resin and 75 weight percent calcium carbonate comprises a bulk density of about 1.42 g/cc.

The described features, structures, or characteristics of the invention may be combined in any suitable manner in one or more embodiments. In the above description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention. In other words, the present invention may be embodied in other specific forms without departing from its spirit or essential characteristics. The described implementations are to be considered in all respects only as illustrative and not restrictive. The scope of the invention should, therefore, be determined not with reference to the above description, but instead should be determined with reference to the pending claims along with their full scope or equivalents, and all changes which come within the meaning and range of equivalency of the claims are to be embraced within their full scope.

We claim:

1. A composite formulation filler concentrate, consisting of:
   a mineral filler;
   a plurality of hollow plastic microspheres; and
   a liquid selected from the group consisting of glycols, silicone oils, and natural oils.

2. The composite formulation filler concentrate of claim 1, wherein said hollow plastic microspheres are present at a level of between about 1 to about 5 weight percent of said filler concentrate.

3. The composite formulation filler concentrate of claim 1, wherein said hollow plastic microspheres comprise up to 80 volume percent of said filler concentrate.

4. The composite formulation filler concentrate of claim 1, wherein said liquid is propylene glycol.

5. The composite formulation filler concentrate of claim 4, wherein said propylene glycol is present at a level of 1-3 weight percent of said filler concentrate.

6. The composite formulation filler concentrate of claim 1, wherein said mineral filler is selected from the group consisting of calcium sulfate, calcium carbonate, aluminum trihydrate, talc, gypsum, magnesium hydroxide, and dolomite.

7. The composite formulation filler concentrate of claim 6, wherein said mineral filler is calcium sulfate.

8. The composite formulation filler concentrate of claim 6, wherein said mineral filler is calcium carbonate.

9. A composite formulation, consisting of:
   50 weight percent polyester resin;
   45 weight percent calcium sulfate; and
   5 weight percent of the filler concentrate of claim 1.

10. A composite formulation, consisting of:
    75 weight percent polyester resin;
    25 weight percent of the filler concentrate of claim 1.

11. A composite formulation, consisting of:
    50 weight percent polyester resin; and
    50 weight percent of the filler concentrate of claim 1.

* * * * *